United States Patent [19]

Miyajima

[11] Patent Number: 4,963,001
[45] Date of Patent: Oct. 16, 1990

[54] LIQUID CRYSTAL DISPLAY DEVICE
[75] Inventor: Akira Miyajima, Tokorzawa, Japan
[73] Assignee: Citizen Watch Co., Ltd., Tokyo, Japan
[21] Appl. No.: 396,673
[22] Filed: Aug. 22, 1989
[30] Foreign Application Priority Data Aug. 23, 1988 [JP] Japan ............................ 63-110265[U]
Nov. 29, 1988 [JP] Japan ............................ 63-155413[U]

[51] Int. Cl.⁵ ........................ G02F 1/13; G03B 21/14
[52] U.S. Cl. ......................... 350/331 R; 350/334; 350/337; 350/330; 353/119; 353/60
[58] Field of Search ............... 350/334, 331 R, 337, 350/330; 353/122, 119, 60

[56]  References Cited
U.S. PATENT DOCUMENTS 4,357,061 11/1982 Crosby ........................ 350/334 X
4,727,285 2/1988 Taniguchi ........................ 350/330
4,826,296 5/1989 Yoshimura ........................ 350/334 X
4,904,079 2/1990 Yoshimura et al. ................ 353/122

Primary Examiner—Stanley D. Miller
Assistant Examiner—Huy K. Mai
Attorney, Agent, or Firm—Birch, Stewart, Kolasch & Birch

[57] ABSTRACT

A liquid crystal display device is used in a projector for projecting an image on a liquid crystal display panel onto a screen. The display device has a housing having a panel housing portion and a control circuit housing portion. The liquid crystal display panel is housed in the panel housing portion, and a control circuit is housed in the control circuit housing portion. A pair of transparent shielding plates are provided on the front and rear covers for protecting the liquid crystal display panel. A part of the front and rear covers adjacent the shielding plates are made of metal for radiating heat of the liquid crystal display panel.

8 Claims, 8 Drawing Sheets

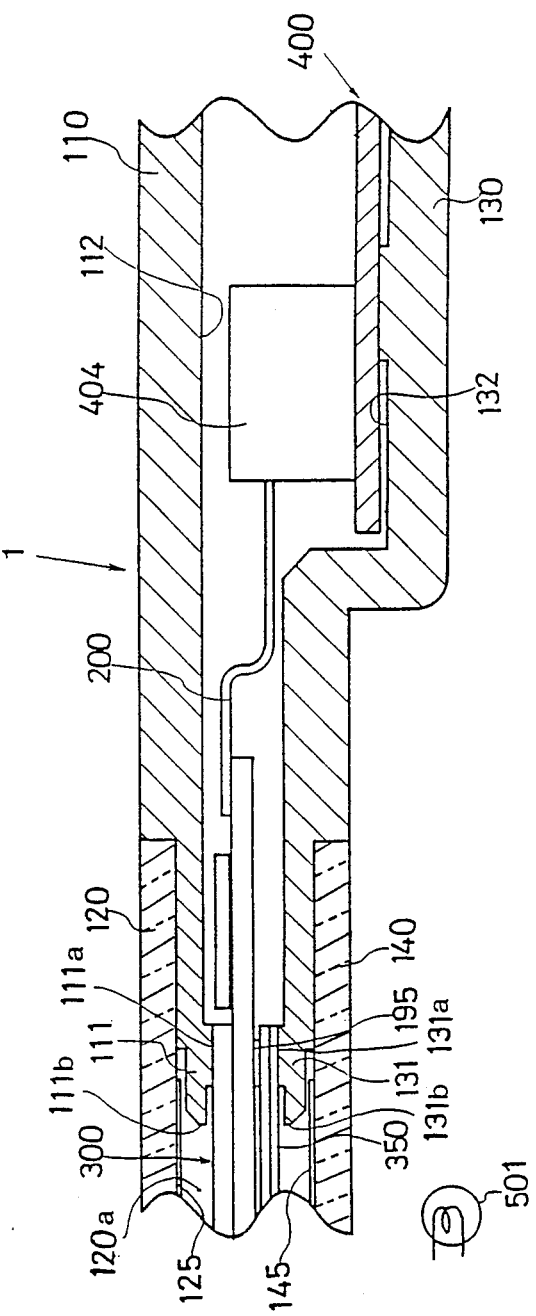

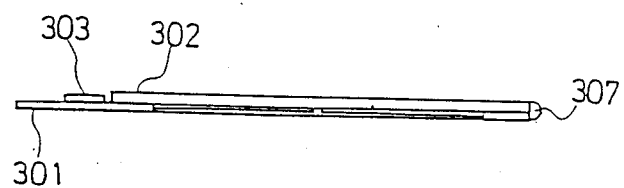
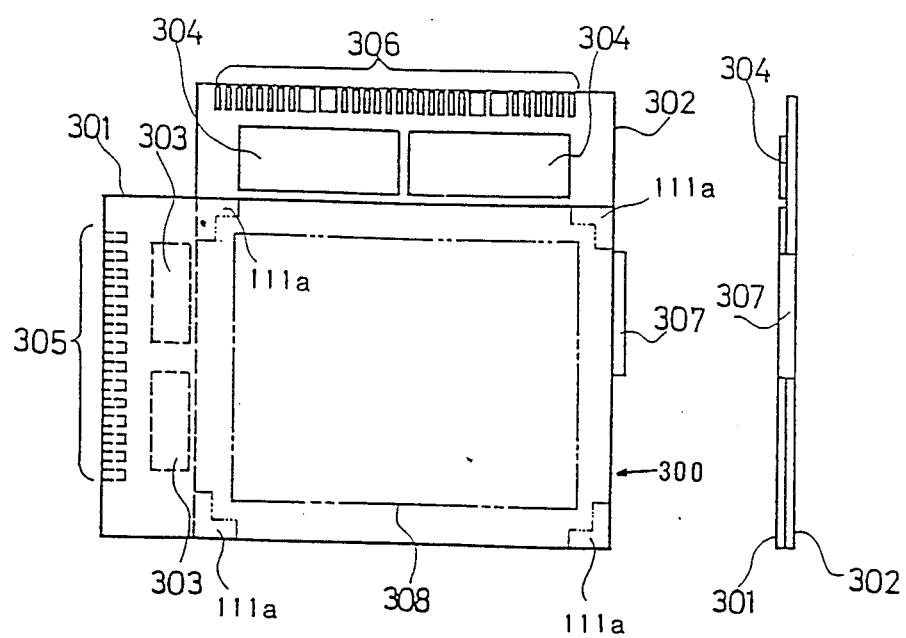

LIQUID CRYSTAL DISPLAY DEVICE

BACKGROUND OF THE INVENTION

The present invention relates to a small liquid crystal display device which is inserted in a projector for projecting an image on the liquid crystal display device onto a screen.

The liquid crystal display device used for the purpose of the projection of the image is classified into two large groups as follows.

(I) A liquid crystal projector having a light source, a lens for magnifying the image, and a liquid crystal display panel integrally assembled in the projector.

(II) A projector having a light source and a lens for magnifying the image, in which a liquid crystal display device is detachably mounted.

Further, the system of (II) is divided to two types.

(II-1) An over head projector (OHP) on which a liquid crystal display device is mounted.

(II-2) A slide projector in which a liquid crystal display device is inserted.

The systems of groups (I) and (II-1) are produced and sold now.

Japanese Utility Model Application Laid-open Publications 61-119145 and 62-12147 disclose a system of group (II-2).

FIG. 7 shows a conventional liquid crystal display device disclosed in the Japanese Utility Model Application Laid-open Publication 61-119145. The device comprises a projector 600 in which a light source 603 and a plurality of lenses 601 are provided. A liquid crystal display panel module 606 is adapted to attach to the projector 600 and electrically connect thereto through a connector 607 of the module 606 and a connector 604 of the projector 600. The module 606 is illuminated by the light source 603 and an image of the module is magnified by lenses 601 and projected on a screen 601.

FIGS. 8a and 8b show another conventional device disclosed in the Japanese Utility Model Application Laid-open Publication 62-12147. A holder 706 is interposed between a light source 702 and a lens 704 in a projector 700. The holder 706 is adapted to hold a slide film 707 and a liquid crystal display plate 703. The holder 706 attached to the projector 700 is reciprocated in the horizontal direction as shown by arrows a and b in FIGS. 8a, so that either of the slide 707 and the plate 703 may be selected.

In the conventional projector, a tungsten halogen lamp is used for the light source. The light emitted from the light source includes the infrared ray having a wavelength of 770 nm or more. In particular, when the material of the liquid crystal display panel absorbs the light including a near infrared ray having a wavelength of 50 μm or less, thermal motion occurs in the material so that the temperature of the material rises. The projector is usually provided with a heat absorbing filter to shut off the near infrared ray. However, it is difficult to completely absorb the near infrared ray with the heat absorbing filter. When it is intended to increase the magnification of the image so as to provide a bright image on the screen, a light source having a large illuminance must be used. However, quantity of heat in the material increases. If the temperature of the liquid crystal exceeds a predetermined value which is determined in accordance with the material of the liquid crystal, the liquid crystal becomes isotropic, so that no image appears on the display panel. Therefore, it is necessary to take measures for heat. Furthermore, in the case that high contrast of the image is required, polarized plates are provided in the liquid crystal display device. However, the polarized plates absorb about 50% of the transmitted light the energy of which becomes heat. If the polarized plates are attached to glasses forming the liquid crystal display panel, the temperature of the liquid crystal between glasses rises.

In conventional liquid crystal display systems described above, neither the liquid crystal display panel module 606 shown in FIG. 7 nor holders 706 and liquid crystal display plate 703 shown in FIG. 8 are provided with any structures to avoid rise of the temperature of the liquid crystal.

SUMMARY OF THE INVENTION

The object of the present invention is to provide a liquid crystal display device which is capable of being used in an ordinary projector, and may prevent the liquid crystal from deteriorating due to heat.

According to the present invention, there is provided a liquid crystal display device inserted between a light source and a lens of a projector for projecting an image onto a screen, comprising, a housing comprising a front cover and a rear cover provided for forming a panel housing portion and a control circuit housing portion, a liquid crystal display panel housed in the panel housing portion, a control circuit housed in the control circuit housing portion. A pair of transparent shielding plates are provided on the front and rear covers for closing openings formed in the panel housing portion at opposite sides of the liquid crystal display panel, and each of the shielding plates is disposed to form a space between the plate and the liquid crystal display. At least a part of the rear cover adjacent the shielding plate is made of metal.

In an aspect of the invention, a polarized plate is secured to the shielding plate on the rear cover. The liquid crystal display panel may be disposed between the front and rear covers interposing spacers.

In another aspect of the invention, a radiating fan is provided for cooling the liquid crystal display panel.

These and other objects and features of the present invention will become more apparent from the following detailed description with reference to the accompanying drawings.

BRIEF DESCRIPTION OF DRAWINGS

FIG. 2 is an enlarged sectional view of the device taken along a line II—II of FIG. 1a;

FIG. 3a is a front view showing a liquid crystal display panel of the device;

FIG. 3b is a top view of the panel;

FIG. 3c is a side view of the panel;

FIG. 6b is a side view of the device of FIG. 6a;

DETAILED DESCRIPTION OF THE PREFERRED EMBODIMENTS

Figure 1B:
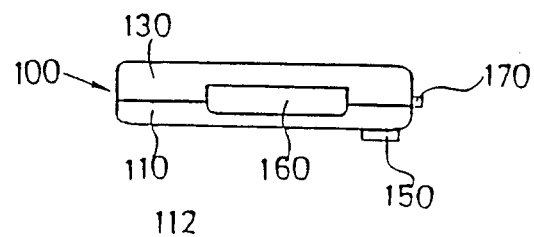
FIG. 1b is a top view of the device; display a device according to the present invention.
Figure 1C:
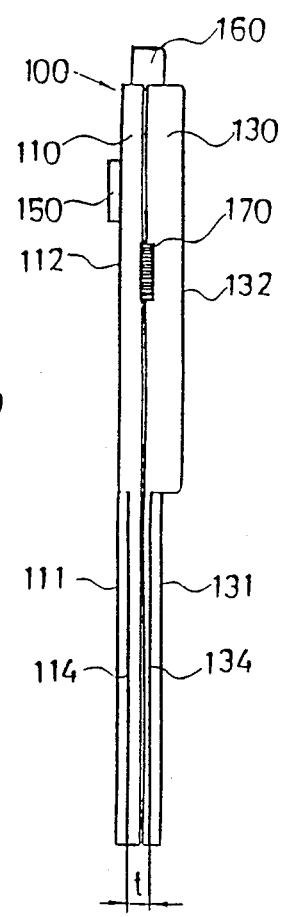
FIG. 1c is a bottom view of the device.
Figure 1A:
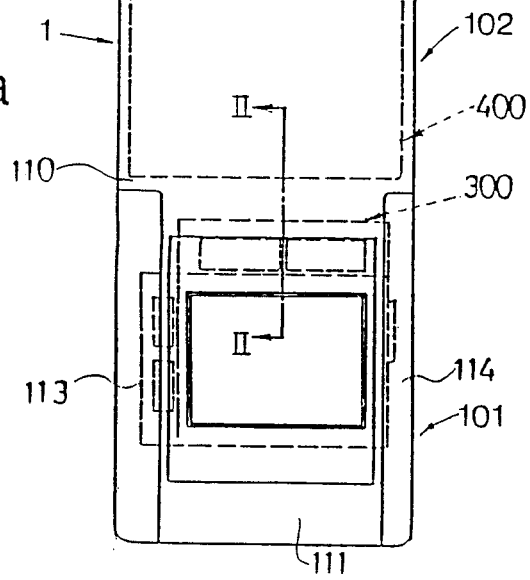
FIG. 1a is a front view of a small liquid crystal

Referring to FIGS. 1a to 1d, a small liquid crystal display device 1 according to the present invention comprises a housing 100 made of metal such as aluminum having a front cover 110 and a rear cover 130. Here the front means side of the lens of the projector and the rear means the side of the light source. The housing 100 has a panel housing portion 101 at a lower portion, and a control circuit housing portion 102 at an upper portion, which are longitudinally arranged. A liquid crystal display panel 300 and a control circuit board 400 for controlling the panel 300 are housed in the panel housing portion 101 and the control circuit housing portion 102 as shown by dotted lines of FIG. 1a. As shown in FIG. 1c, a lower part of the rear cover 130 is reduced in thickness to form a thinner panel housing 131. At the panel housing portion 101 of the housing 100, the front cover 110 has a panel housing 111 to form the panel housing portion 101 together with the panel housing 131, in which the liquid crystal display panel 300 is mounted. At the upper portion of the housing 100, the front cover 110 and the rear cover 130 have circuit housings 112 and 132 respectively, in which the control circuit board 400 is mounted.

The panel housing 111 has thin holding portions 113 and 114 formed on opposite sides thereof. The panel housing 131 also has thin holding portions 133 and 134 formed on opposite sides thereof, corresponding to holding portions 113 and 114, respectively.

Figure 1D:
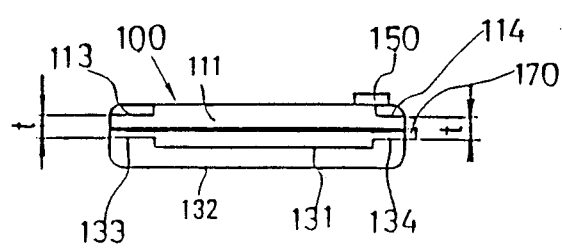
FIG. 1d is a side view of the device.

As shown in FIG. 1d, a left side attached portion composed by holding portions 113 and 133 has a thickness t and a right side attached portion formed by holding portions 114 and 134 also has a thickness t.

When the liquid crystal display device 1 is attached to a projector, the device 1 is engaged with the projector at the holding portions 113, 114, 133 and 134.

The display device 1 has a power switch button 150 on the circuit housing 112, a dial 170 for controlling luminance of the display panel, which is provided on a right side of the housing 100, and an external connector 160 on the top of the housing 100 for receiving an outside signal.

Although, the housing 100 is made of aluminum in consideration of heat conductivity, workability and portability (specific gravity), other metal such as zinc may be used on the grounds of conductivity and workability.

FIG. 2 shows a part of the liquid crystal display panel 300 and a part of the control circuit board 400 of the liquid crystal display device 1. A panel connecting substrate 200 made of a flexible printed circuit board (FPC) is provided for connecting an internal connector 404 of a control circuit on the circuit board 400 to the liquid crystal display panel 300. Front and rear transparent shielding plates 120 and 140 made of acrylic material are provided to close openings 111b and 131b formed in the panel housings 111 and 131, respectively, for protecting the display panel 300. Each shielding plate is mounted on the panel housing 111 (131) so that a space 120a is formed between the shielding plate and the display panel 300. A pair of polarized plates 125 and 145 are attached to the front and rear shielding plates 120 and 140 at inner surfaces thereof, respectively. A liquid crystal cell 350 for correcting phase is attached to the liquid crystal display panel 300 with an adhesive tape 195. The integrated liquid crystal display panel 300 and the phase correcting cell 350 are mounted between holding projections 111a and 131a formed on the panel housing 111 and 131. The display panel 300 and phase correcting cell 350 are employed with liquid crystal having super twisted nematic (STN) display mode. Therefore, the liquid crystal display panel is capable of producing image having a high contrast. However, there is a disadvantage that the liquid crystal display produces colors on the image. In order to prevent the production of color, the phase correcting cell 350 is used.

When the light emitted from a light source 501 (FIG. 2) passes through the polarized plate 145, the light becomes linearly polarized light. Then the linearly polarized light becomes elliptically polarized light when passing the phase correcting cell 350. The elliptically polarized light is transmitted to the liquid crystal display panel 300 and becomes the linearly polarized light again when passing it. When the linearly polarized light passes through the polarized plate, 125, an image is produced on the display.

Referring to FIGS. 3a to 3c, the liquid crystal display panel 300 comprises a glass 301 having scanning electrodes thereon, a glass 302 having signal electrodes thereon, and liquid crystal injected between glasses 301 and 302 through a hole which is sealed by a plug 307. Before injecting liquid crystal, a necessary process for orientating molecules of liquid crystal is performed on glasses 301 and 302. Driving circuits for driving the display panel 300 are provided on the glasses 301 and 302 in the form of chips, which is called chip-on-glass (COG) method. The glass 301 has scanning electrode driving circuit chips 303 mounted thereon and input terminals 305 for scanning electrode driving circuit chips 303. The glass 302 has signal electrode driving circuit chips 304 mounted thereon and input terminals 306 for signal electrode driving circuit chips 304. These chips are adhered to the glasses by paste. The image is displayed in a region defined by a dot-dash line 308. As shown in FIG. 3a, the projections 111a and 131a are disposed at four corners of the overlapped portion of the glasses 301 and 302 so as to form a space between the panel housings 111 and 131 and display panel 300.

Figure 4:
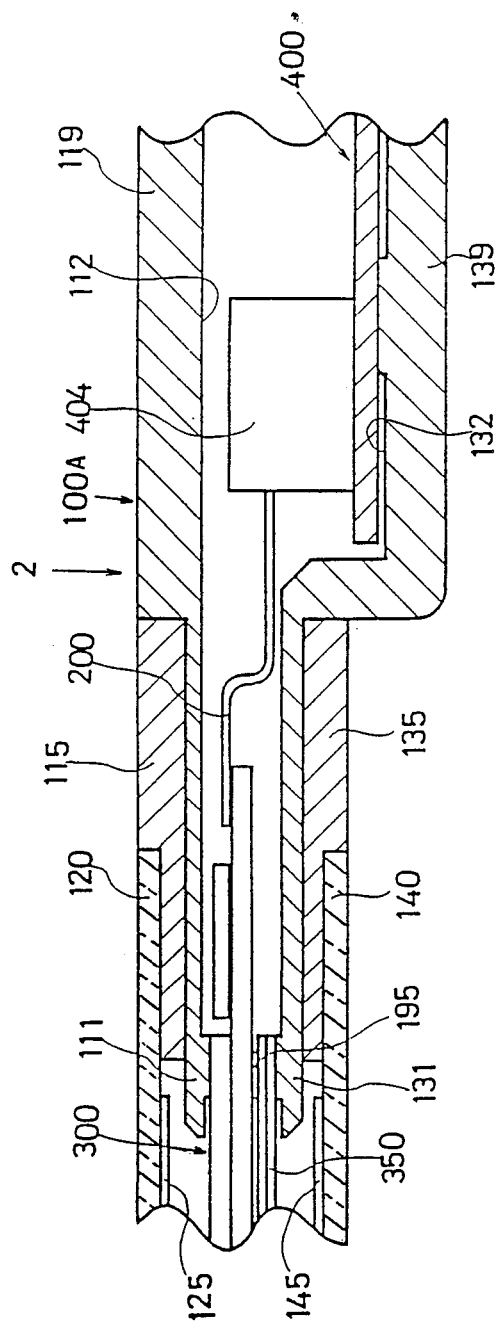
FIG. 4 is a sectional view of a second embodiment of the present invention.

Referring to FIG. 4 showing the second embodiment of the present invention, structures which are the same as the first embodiment and the same parts thereof are identified with the same reference numerals as FIGS. 1 to 3. A liquid crystal display device 2 of the second embodiment comprises a housing 100A having a front cover 119 and a rear cover 139 made of plastics formed by means of injection molding. A pair of supporting frames 115 and 135 made of aluminum are integrally secured to the front and rear covers 119 and 139, respectively for supporting the front and rear shielding plates 120 and 140. The front shielding plate 120 having the polarized plate 125 is secured to the supporting frame 115 with an adhesive tape (not shown). The rear shielding plate 140 having the polarized plate 145 is secured to the supporting frame 135 with an adhesive tape (not shown).

In the second embodiment, only the parts for supporting the shielding plates are made of metal.

Although supporting frames 115 and 135 are made of aluminum, other metal such as zinc, iron or stainless steel can be used because the frame has a simple sectional shape.

Figure 5:
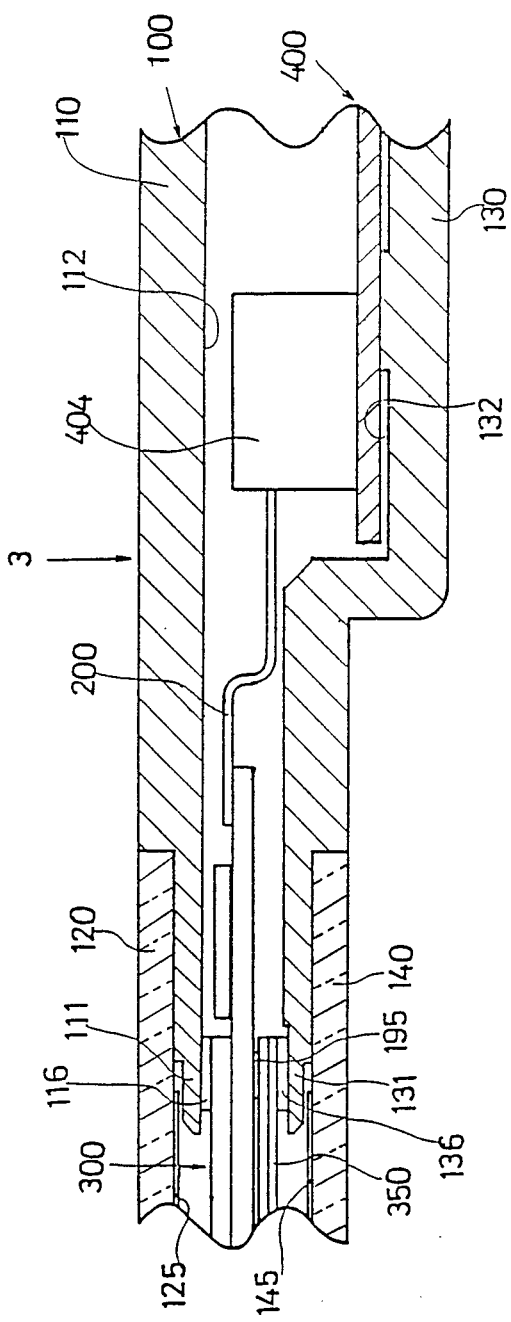
FIG. 5 is a sectional view of a third embodiment.

Referring to FIG. 5 showing the third embodiment, the liquid crystal display device 3 has the housing 100 of the first embodiment. The housing 100 further has a spacer 116 disposed between the panel housing 111 and the liquid crystal display panel 300 and a spacer 136 disposed between the panel housing 131 and the phase correcting cell 350. These spacers 116 and 136 are made of plastics and secured to the panel housings 111 and 131 with adhesive tapes (not shown). Other structures are the same as the first embodiment and the same parts thereof are identified with the same reference numerals as FIGS. 1 to 3.

In this embodiment, plastic spacers are disposed between the metal housing and the liquid crystal display panel so that heat conduction from the housing to the liquid crystal display panel can be prevented. Thus, rise of the temperature of the liquid crystal is effectively avoided.

Figure 6A:
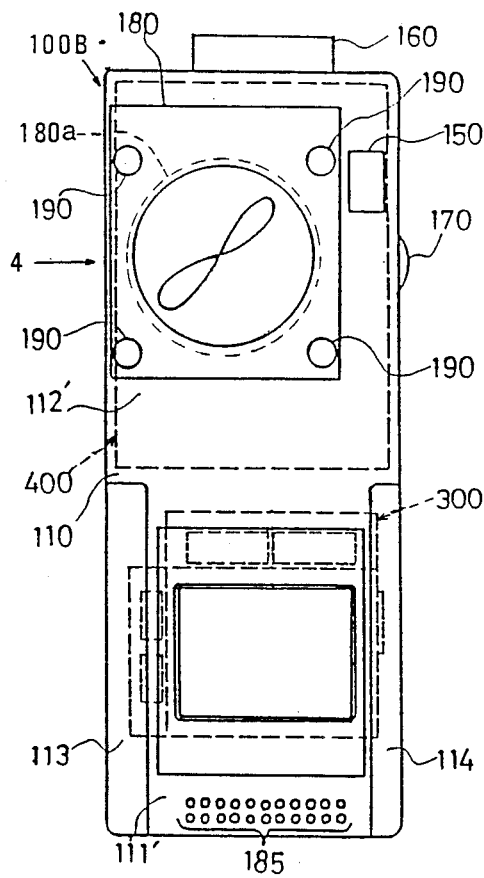
FIG. 6a is a front view of a fourth embodiment.
Figure 6B:
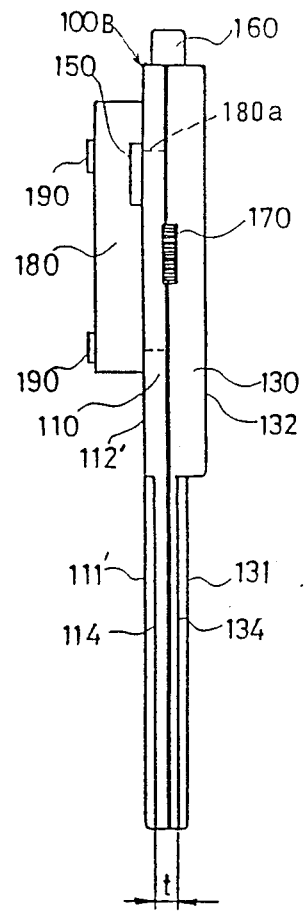
Figure 7:
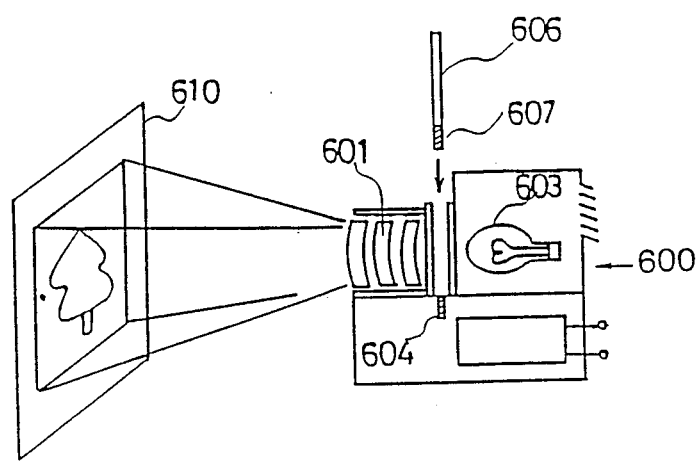
FIG. 7 is a schematic illustration showing a conventional liquid crystal display system.
Figure 8A:
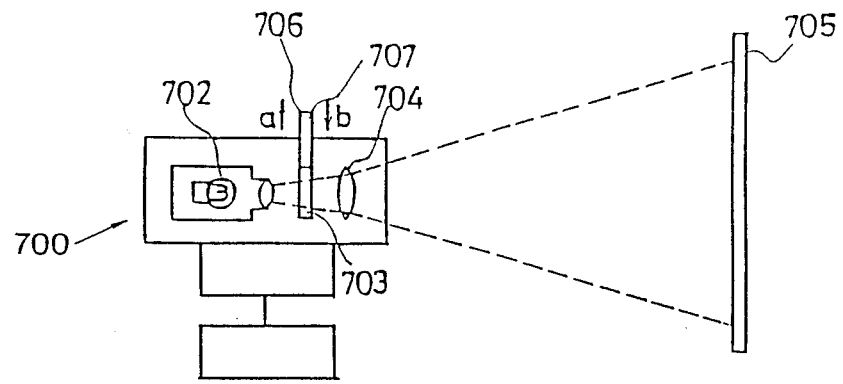
FIGS. 8a and 8b are schematic illustrations showing another conventional system.
Figure 8B:
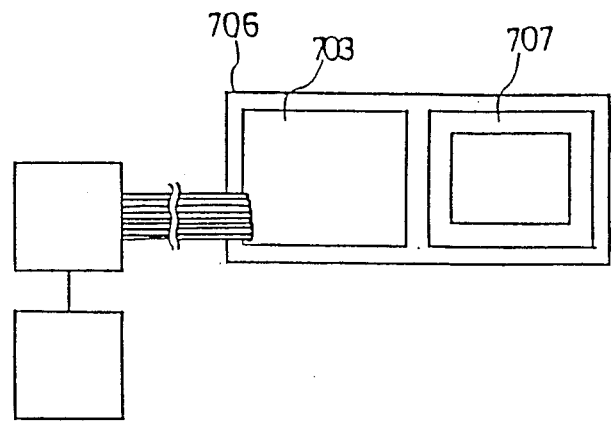

Referring to FIGS. 6a and 6b showing the fourth embodiment, a housing 100B of a liquid crystal display device 4 has a radiating fan 180 which is secured to a circuit housing 112' by screws 190. The circuit housing 112' has an opening 180a for passing cooling air. A panel housing 111' has a plurality of air inlet holes 185 formed on a lower portion thereof. In this embodiment, the liquid crystal display panel 300 integrated with the phase correcting cell 350 is mounted between projections 111a and 131a as shown in FIGS. 2 and 3a. Other structures are the same as the first embodiment and the same parts thereof are identified with the same reference numerals as FIGS. 1 to 3.

When the radiating fan 180 is operated, air is induced from the inlet holes 185, passes along the surfaces of the glasses of the display panel 300 and the phase correcting cell 350 to cool the liquid crystal and is discharged from the housing by means of the radiating fan 180.

Although each of the above described liquid crystal display panel has a phase correcting cell and a pair of polarized plates, these elements are not employed for a liquid crystal display panel using the guest-host display mode, or at least one polarized plate is employed.

In accordance with the present invention, since the housing of the liquid crystal display device is made of metal, the heat of air in the spaces surrounding the crystal display panel, which is increased by the energy of the light emitted from the light source of the projector, is transmitted to the metal housing. Thus, the temperature of the liquid crystal in the liquid crystal display panel can be prevented from rising.

The polarized plate absorbs about 50% of the incident light. Therefore, heat absorbed in the polarized plate can be transmitted to the housing by attaching the polarized plate to the shielding plates. If there is a temperature difference between a central portion and a peripheral portion of the liquid crystal display panel, the image on the display panel comes irregular. In accordance with the present invention, since the temperature is equalized, such an irregular image does not occur.

Although, driving circuit chips are adhered to glasses of the display panel with paste, connection between electrodes and circuit chips can be maintained in safety, by preventing the temperature of the liquid crystal from rising.

When a light source emitting a large luminous energy is used in the projector, rise of the temperature of the liquid crystal in the display panel can be effectively reduced by providing a radiating fan.

While the invention has been described in conjunction with preferred specific embodiments thereof, it will be understood that this description is intended to illustrate and not limit the scope of the invention, which is defined by the following claims.

What is claimed is:

1. A liquid crystal display device inserted between a light source and a lens of a projector for projecting an image onto a screen, comprising:

a housing comprising a front cover and a rear cover provided for forming a panel housing portion and a control circuit housing portion;

a liquid crystal display panel housed in said panel housing portion;

a control circuit housed in said control circuit housing portion;

a pair of transparent shielding plates provided on said front and rear covers for closing openings formed in said panel housing portion at opposite sides of said liquid crystal display panel, each of said shielding plates being disposed to form a space between the plate and said liquid crystal display panel; and at least a part of said rear cover adjacent said shielding plate being made of metal.

2. The liquid crystal display device according to claim 1 further comprising at least one polarized plate.

3. The liquid crystal display device according to claim 2 wherein the polarized plate is secured to said shielding plate on said rear cover.

4. The liquid crystal display device according to claim 1 wherein said liquid crystal display panel is disposed on projections.

5. The liquid crystal display device according to claim 4 wherein the projections are formed on the rear cover to form a space between the display panel and the rear cover.

6. The liquid crystal display device according to claim 5 wherein each of said projections is a spacer made of plastic.

7. The liquid crystal display device according to any one of claim 1 to 6 further comprising a radiating fan provided for cooling the liquid crystal display panel.

8. The liquid crystal display device according to claim 7 wherein the panel housing portion has air inlet holes.

* * * * *